United States Patent [19]
Shimizu et al.

[11] Patent Number: 5,945,156
[45] Date of Patent: Aug. 31, 1999

[54] METHOD OF MANUFACTURING MAGNETIC RECORDING MEDIUM

[75] Inventors: Yoshihiro Shimizu; Jun Hashimoto; Taro Ohmura, all of Miyagi, Japan

[73] Assignee: Sony Corporation, Tokyo, Japan

[21] Appl. No.: 08/908,168

[22] Filed: Aug. 7, 1997

[30] Foreign Application Priority Data

Aug. 8, 1996 [JP] Japan ..................... 8-210120

[51] Int. Cl.$^6$ ....................................... B05D 5/12

[52] U.S. Cl. ........................................... 427/130; 428/900

[58] Field of Search ..................... 427/128–132, 427/900

[56] References Cited

U.S. PATENT DOCUMENTS 5,645,917  7/1997  Ejira et al. .............................. 428/141

*Primary Examiner*—Bernard Pianalto
*Attorney, Agent, or Firm*—Hill & Simpson

[57] ABSTRACT

A method of manufacturing a magnetic recording medium having excellent magnetostatic and electromagnetic conversion properties for high density recording is provided, wherein magnetic powder (P) is kneaded with a binding agent (B) mainly comprising low molecular weight vinyl chloride resin whose number-average molecular weight is 8000 to 20000 with a P/B ratio of 7 or more before preparing the magnetic coating material so as to be coated on a non-magnetic base material.

11 Claims, No Drawings

METHOD OF MANUFACTURING MAGNETIC RECORDING MEDIUM

BACKGROUND OF THE INVENTION

The present invention relates to a method of manufacturing a magnetic recording medium, more particularly to a method of manufacturing a magnetic recording medium comprising magnetic powder, and a binding agent mainly comprising vinyl chloride resin.

In recent years, the capacity of a magnetic recording medium is becoming larger and larger. For a coating type magnetic recording medium, there have been various methods adopted for improving the recording capacity; some is to extend a full length of a magnetic tape as a magnetic recording medium and another is to provide such an improved recording system as to narrow track pitches or to shorten wave length for recording. Among those methods, a method of adopting a shortened wave length for recording requires a high density of recording and a high output for the recording medium, for which a magnetic powder having a higher coercive force and a higher magnetic flux density is used for the magnetic layer of the object magnetic tape. Thus, the magnetic powder becomes further needle-like and fine in structure.

One of the conditions for manufacturing magnetic tape having favorable recording and reproducing properties is to disperse magnetic powder sufficiently in a magnetic coating material. However, the above fine magnetic powder has large cohesive force, so that it is difficult to disperse aggregate of such a fine magnetic powder using the related art method that uses conventional binding agent, dispersing agent, etc. With a magnetic tape thus manufactured with such fine magnetic powder using the related art method, the required and expected magnetostatic property and electromagnetic conversion property cannot be satisfied due to insufficient dispersion of the magnetic powder.

Under such circumstances, it is an object of this invention to provide a method of manufacturing a magnetic recording medium, which can disperse needle-like and fine magnetic powder sufficiently to realize higher density recording.

SUMMARY OF THE INVENTION

According to the method of manufacturing a magnetic recording medium provided by the present invention when the magnetic coating material is prepared by kneading magnetic powder and a binding agent mainly comprising vinyl chloride resin using an organic solvent, low molecular weight vinyl chloride resin whose number-average molecular weight is 8000 to 20000 is used as the vinyl chloride resin and the resin is kneaded with 7 or more of weight ratio of magnetic powder to binding agent (P/B ratio). Consequently, fine magnetic powder having a large aggregating force can be dispersed sufficiently, so that the magnetic recording medium obtained by coating a non-magnetic base material with the magnetic coating material prepared by adding a binding agent, a lubricant, an abrasive, an organic solvent, etc. to the mixture appropriately shows far more excellent magnetostatic and electromagnetic conversion properties.

DESCRIPTION OF THE PREFERRED EMBODIMENTS

In the following, an embodiment of this invention for manufacturing a magnetic recording medium will be explained.

Fe—Co powder (specific surface area: 50 $m^2/g$, major axis: 0.05 $\mu m$, coercive force: 150 $kA/m^2$, saturation magnetization: 140 $Am^2/kg$) is used as the magnetic powder and low molecular w eight vinyl chloride r esin with number-average molecular weight of 10000 is uses as the vinyl achloride resin for producing kneaded compositions of embodiments 1 through 4 and comparing examples 1 through 3 as shown in Table 1. The compositions in each embodiment/comparing example were kneaded for 10 minutes.

The vinyl chloride resin described here means a homopolymer or copolymer of vinyl chloride. The copolymer is, for example, copolymer of vinyl chloride and vinyl acetate, copolymer of vinyl chloride, vinyl acetate, and vinyl alcohol, copolymer of vinyl chloride and vinylidene chloride, copolymer of vinyl chloride and acrylonitrile, or vinyl chloride polymer with introduction of polar groups of $—SO_3Na$, $—SO_2Na$, and the like or an epoxy group.

In Table 1, in addition to vinyl chloride resin, polyester polyurethane is added as needed as a binding agent to change the weight ratio of the magnetic powder (P) to the binding agent (B) (P/B ratio). Furthermore, organic solvent of cyclohexanone is added so that the solid magnetic powder and the binding agent as solid content give a total solid content concentration of 80%. Only in the comparing example 3, is used the conventionally used vinyl chloride resin with the number-average molecular weight of 25000.

TABLE 1

Compositions in Each Embodiment and Comparing Example in Kneading**

| Material | | Embodiment 1 | Embodiment 2 | Embodiment 3 | Embodiment 4 | Comparing Example 1 | Comparing Example 2 | Comparing Example 3 |
|---|---|---|---|---|---|---|---|---|
| Magnetic powder | Fe–Co (specific surface area = 50 $m^2/g$) | 100 | 100 | 100 | 100 | 100 | 100 | 100 |
| Binding agent | Low molecular weight vinyl chloride resin | 10.0 | 10.0 | 10.0 | 9.1 | 10.0 | 10.0 | 10* |
| | Polyester polyurethane | 4.3 | 3.0 | 1.1 | 0 | 10.0 | 6.7 | 0 |
| Organic solvent | Cyclohexane | 28.6 | 28.3 | 27.8 | 27.3 | 30 | 29.2 | 27.5 |
| P/B ratio in kneading | | 7.0 | 7.7 | 9.0 | 11.0 | 5.0 | 6.0 | 10.0 |
| Solid content weight | | 114.3 | 113.0 | 111.1 | 109.1 | 120.0 | 116.7 | 110.0 |
| Solid content concentration in kneading (%)*** | | 80 | 80 | 80 | 80 | 80 | 80 | 80 |

*Vinyl chloride resin of number-average molecular weight 25000 is used only in the comparing example 3.
**Unit of items other than P/B ratio in kneading and solid content concentration is part by weight.
***((magnetic powder + binding agent) ÷ (magnetic powder + binding agent + solvent)) × 100 (%)

Compositions shown in Table 1 were kneaded by a 2-inch diameter continuous double spindle kneading machine (Kurimoto, Ltd.). The continuous double spindle kneading machine is provided with a pair of shafts each having screw blades and a barrel accommodating these shafts rotatably. The screw rotation speed was 300 rpm and the supply speed of the compositions was 150 g/min in each embodiment/comparing example. It took about 3 to 5 minutes to discharge the compositions from the tip of the continuous double spindle kneading machine after they were supplied to the base of the machine.

After the above kneading ended, the materials shown in Table 2 other than a curing agent of polyisocyanate was added to each kneaded material which is further stirred by a vertical sand mill for 4 hours to prepare the 7 kinds of magnetic coating materials of embodiments 1 through 4 and comparing examples 1 through 3. The curing agent polyisocyanate (Coronate L, Nippon Polyurethane) was added just before coating.

terephthalate film so that the thickness of each material layer becomes 2.0 $\mu$m after being dried. Furthermore, on the back side of the polyethylene terephthalate film was coated with a back coating layer comprising binding agent, carbon powder as non-magnetic powder, lubricant, abrasive, etc. so that the thickness after being dried becomes 0.5 $\mu$m. Then, the polyethylene terephthalate film was slitted to manufacture 7 kinds of magnetic tapes each having a width of 8 mm.

The magnetostatic and electromagnetic conversion properties of the above 7 kinds of magnetic tapes were measured as shown below.

Magnetostatic property:

Coercive force Hc, residual magnetic flux density Br, and squareness ratio Rs were obtained using a vibration sample magnetometer (Toei Kogyo).

TABLE 2

| | | \multicolumn{7}{c}{Materials Added after Mixing**} |
|---|---|---|---|---|---|---|---|---|
| Material | | Embodiment 1 | Embodiment 2 | Embodiment 3 | Embodiment 4 | Comparing Example 1 | Comparing Example 2 | Comparing Example 3 |
| Binding agent | Low-molecular weight vinyl chloride resin | 0 | 0 | 0 | 0.9 | 0 | 0 | 0 |
| | Polyester polyurethane | 5.7 | 7.0 | 8.9 | 10.0 | 0.0 | 3.3 | 10.0 |
| Lubricant | Butyl stearate | 1.0 | 1.0 | 1.0 | 1.0 | 1.0 | 1.0 | 1.0 |
| Abrasive | Alumina | 5.0 | 5.0 | 5.0 | 5.0 | 5.0 | 5.0 | 5.0 |
| Organic solvent | Methyl ethyl ketone | 151.2 | 15.12 | 151.2 | 151.2 | 151.2 | 151.2 | 151.2 |
| | Toluene | 91.0 | 91.0 | 91.0 | 91.0 | 91.0 | 91.0 | 91.0 |
| | Cyclohexane | 32.1 | 32.4 | 32.9 | 33.4 | 30.7 | 31.5 | 33.2 |
| Curing agent* | Polyisocyanate | 4 | 4 | 4 | 4 | 4 | 4 | 4 |
| P/B ratio in magnetic coating material | | 5.0 | 5.0 | 5.0 | 5.0 | 5.0 | 5.0 | 5.0 |
| Solid content concentration in magnetic coating material(%)*** | | 30 | 30 | 30 | 30 | 30 | 30 | 30 |

*Only the curing agent polyisocyanate is added just before coating.
**Unit of items other than P/B ratio and solid content concentration in magnetic coating material is part by weight.
***((magnetic powder + binding agent + additives) (magnetic powder + binding agent + solvent + additives)) × 100 (%)

Consequently, coating materials comprising magnetic powder of 100 parts by weight, vinyl chloride resin of 10 parts by weight, polyurethane of 10 parts by weight, a lubricant, an abrasive, and a curing agent were obtained with a solid content concentration of 30%. Each of those 7 kinds of magnetic coating materials were coated on a polyethylene Electromagnetic conversion property:
The reproduction output signal to the 8.5 MHz input signal was obtained using a Data 8 mm tape drive EXB-8505XL (EXABYTE). The output level for the comparing example 3 using conventional vinyl chloride resin taken as 0 dB.
Table 3 shows measurement results.

TABLE 3

| \multicolumn{8}{c}{Magnetostatic and Electromagnetic Conversion Properties of Each Magnetic Tape in Embodiments/Comparing Example} |
|---|---|---|---|---|---|---|---|
| Magnetic Tapes | Embodiment 1 | Embodiment 2 | Embodiment 3 | Embodiment 4 | Comparing Example 1 | Comparing Example 2 | Comparing Example 3 |
| P/B ratio in kneading | 7 | 7.7 | 9 | 11 | 5 | 6 | 10 |
| Coercive force Hc[kA/m] | 165 | 166 | 165 | 164 | 161 | 163 | 163 |
| Residual magnetic flux density Br[mT] | 314 | 325 | 324 | 327 | 302 | 305 | 291 |
| Squareness ratio Rs(%) | 85.0 | 86.0 | 86.3 | 86.0 | 83.9 | 84.1 | 79.8 |
| Reproduction output (dB) | 1.4 | 1.6 | 2.0 | 3.1 | 0.7 | 0.9 | 0 |

As understood from the measurement results in Table 3, in embodiments 1 through 4 for which kneading was performed with 7 or more of P/B ratios, the weight ratio of magnetic powder (P) to binding agent (B), using a binding agent mainly comprising low molecular weight vinyl chloride resin whose number-average molecular weight is 10000, magnetic powder could be well kneaded with the binding agent, so that the magnetic powder was dispersed sufficiently. Consequently, those embodiments were confirmed to be able to manufacture a magnetic tape excellent in both magnetostatic property and electromagnetic conversion property. On the contrary, in the comparing examples 1 and 2 in which the P/B ratio was small, it was found that the magnetic powder could not be kneaded nor dispersed sufficiently even when the same low molecular weight vinyl chloride resin as the above was used. Thus, the magnetic tape manufactured in these comparing examples is worse in both magnetostatic and electromagnetic conversion properties. Furthermore, as shown in the comparing example 3, even when the P/B ratio is 10 or more than 7, it is found that kneading and dispersion are insufficient in case the number-average molecular weight of the used vinyl chloride resin is taken to be conventional 25000.

In other words, a magnetic coating material in which fine magnetic powder is dispersed enough can be obtained only when magnetic powder is kneaded with a binding agent mainly comprising low molecular weight vinyl chloride resin so that the P/B ratio becomes 7 or more. As a result, the magnetic recording medium obtained by coating a non-magnetic support material with a magnetic coating material prepared from such a mixture with binding agent, lubricant, abrasive, and organic solvent further added there to as needed can be provided with significantly improved magnetostatic and electromagnetic conversion properties.

Although embodiments of the present invention are explained as above, the invention is of course not limited to those embodiments, but they can be variously modified on the basis of the technical spirit of the invention.

For example, although vinyl chloride resin whose number-average molecular weight is 10000 is used in the embodiments of the invention, vinyl chloride resin with number-average molecular weight of within 8000 to 20000 can also be used favorably. If the number-average molecular weight is less than 8000, uncrosslinked components function like a plasticizing agent in the coating to reduce the rigidity of the coating. If the number-average molecular weight is more than 20000, the solubility for the organic solvent is lowered and the dynamic load in kneading is increased, so that kneading is ended insufficiently.

Furthermore, in the embodiments of the invention, polyester polyurethane as a binding agent is mixed with the low molecular weight vinyl chloride resin while they are kneaded and/or when the magnetic coating material is prepared after the kneading. However, all of resins having been well known as binding agents except the polyester polyurethane can be mixed with the low molecular weight vinyl chloride resin with their weight being in the range up to that of the latter in and/or after the kneading process. In addition to the vinyl chloride resin used in kneading, cellulose derivative such as nitrocellulose, etc., acrylic resin, copolymer of ethylene and vinyl acetate, polyvinyl acetal resin comprising polyvinyl butyral resin, etc., epoxy resin, phenoxy resin, and polyurethane resin (ex., polycarbonate polyurethane resin, polyurethane resin containing polar groups such as —$SO_3Na$, —$SO_2Na$, etc.) can be mixed with the low molecular weight vinyl chloride resin.

Furthermore, in the embodiments according to the invention, although ferromagnetic Fe—Co powder is used as magnetic powder, other conventionally well known magnetic powders can also be used. The magnetic powder may be oxide magnetic powder or metallic magnetic powder. As such oxide magnetic powder, there are, for example, $\gamma$-$Fe_2O_3$, Co contained $\gamma$-$Fe_2O_3$, $Fe_3O_4$, Co contained $Fe_3O_4$, Co clad $Fe_3O_4$, $CrO_2$, and the like. As metallic magnetic powder, there are, for example, Fe—Co—Ni, Fe—Co—B, Fe—Co—Cr—B, Fe—Co—V, Mn—Bi, and Mn—Al. Furthermore, to improve various properties thereof, metallic components such as Al, Si, Ti, Cr, Mn, Cu, Zn, and the like may also be added. In addition to them, hexagonal system ferrite such as barium ferrite, etc., or nitriding iron, etc. may be used. Any of those magnetic powders is dispersed in uniform more effectively than those in the related art and has come to exhibit higher magnetostatic and electromagnetic conversion properties.

Furthermore, although a continuous double spindle kneading machine is used in the embodiments, the kneading machine that have been conventionally well known may also be used without any limitation as, for example, kneaders, pressure kneaders, continuous kneaders, extruders, multi-step diluent extruders, etc. Furthermore, although a vertical sand mill is used for preparing the coating material in the embodiments, any of other horizontal sand mills, spike mills, ball mills, tower mills, wet type medium stirring DCP mills, etc. may also be used.

Furthermore, although a polyethylene terephthalate film is used as a non-magnetic base material in the embodiments, any of other well known materials can be used as the non-magnetic base material. For example, any base material formed with a high molecular material represented by polyester group including polyethylene 2 and 6-naphthalate, polyolefine groups such as polyethylene, polypropylene, etc., cellulosics such as cellulose triacetate, cellulose diacetate, cellulose triacetate buthyrate, etc., vinyl resin such as polyvinyl chloride, polyvinylidene chloride, etc., as well as a metallic plate made of a lightweight metal comprising aluminum alloy, titan alloy, etc., and a base material made of alumina, glass, ceramics, etc. may be used. Furthermore, its shape can be formed freely. It may be shaped like tape, sheet, drum etc.

The invention is embodied as shown above with the following advantages.

By kneading a mixture of fine magnetic powder (P) essential to high density recording magnetic recording medium, especially fine needle-like magnetic powder, and a binding agent (B) mainly comprising low molecular weight vinyl chloride resin with a 7 or more P/B ratio as a weight ratio using an organic solvent, the magnetic powder is dispersed in uniform so as to obtain a magnetic recording medium having excellent magnetostatic and electromagnetic conversion properties that have not been achieved by any of kneading methods in related art. Consequently, the invention enables higher density recording which contributes greatly to the field of information recording.

What is claimed is:

1. A method for making a magnetic recording medium comprising the steps of:
   (a) preparing a pre-mixed dispersion by admixing a composition of a magnetic powder and a low molecular weight vinyl chloride resin binder having a number average molecular weight of from about 8,000 to about 20,000 at a magnetic powder (P) to binder (B) weight ratio (P/B) of at least about 7, said composition further including an amount of an organic solvent to provide a total solids content for the composition of about 80%, and thereafter, kneading the composition until a substantially uniform, pre-mixed dispersion is obtained;

(b) preparing a magnetic coating composition by admixing the pre-mixed dispersion obtained in step (a) with a lubricant, an abrasive, an organic solvent, a further amount of a resin binder and a curing agent, and milling to provide a coating composition having a solids content of about 30% by weight;

(c) providing a non-magnetic substrate having a surface;

(d) applying the magnetic coating composition onto the surface to provide a magnetic coating layer thereon; and (e) thereafter, drying and curing the coating layer to provide the magnetic recording medium.

2. A method as defined in claim 1, wherein in step (b), the curing agent comprises a polyisocyanate which is admixed into the magnetic coating composition immediately before the magnetic coating composition is applied on a surface of the non-magnetic substrate.

3. A method as defined in claim 1, wherein in step (b), the organic solvent comprises a mixture of solvents including methyl ethyl ketone, toluene and cyclohexane.

4. A method as defined in claim 1, wherein in step (b), the abrasive comprises alumina.

5. A method as defined in claim 1, wherein in step (b), the lubricant comprises butyl stearate.

6. A method as defined in claim 1, wherein in step (a) the magnetic powder comprises an Fe—Co powder having a specific surface area of about 50 $m^2/g$, a major axis of about 0.05 $\mu$m, a coercive force of about 150 $kA/m^2$ and a saturation magnetization of about 140 $Am^2/kg$.

7. A method as defined in claim 1, wherein in step (a), the organic solvent comprises cyclohexanone.

8. A method as defined in claim 1, wherein in step (a), the resin binder has a number average molecular weight of about 10,000.

9. A method as defined in claim 1, wherein in step (a), the step of kneading is performed using a continuous double spindle kneading machine.

10. A method as defined in claim 1, wherein in step (b), the resin binder added is the same or different as the resin binder of step (a).

11. A method as defined in claim 1, wherein in step (b), the resin binder comprises a polyester polyurethane.

* * * * *